E. G. SANDERSON.
EDUCATIONAL GAME APPARATUS.
APPLICATION FILED NOV. 12, 1908.
952,997.
Patented Mar. 22, 1910.
2 SHEETS—SHEET 1.
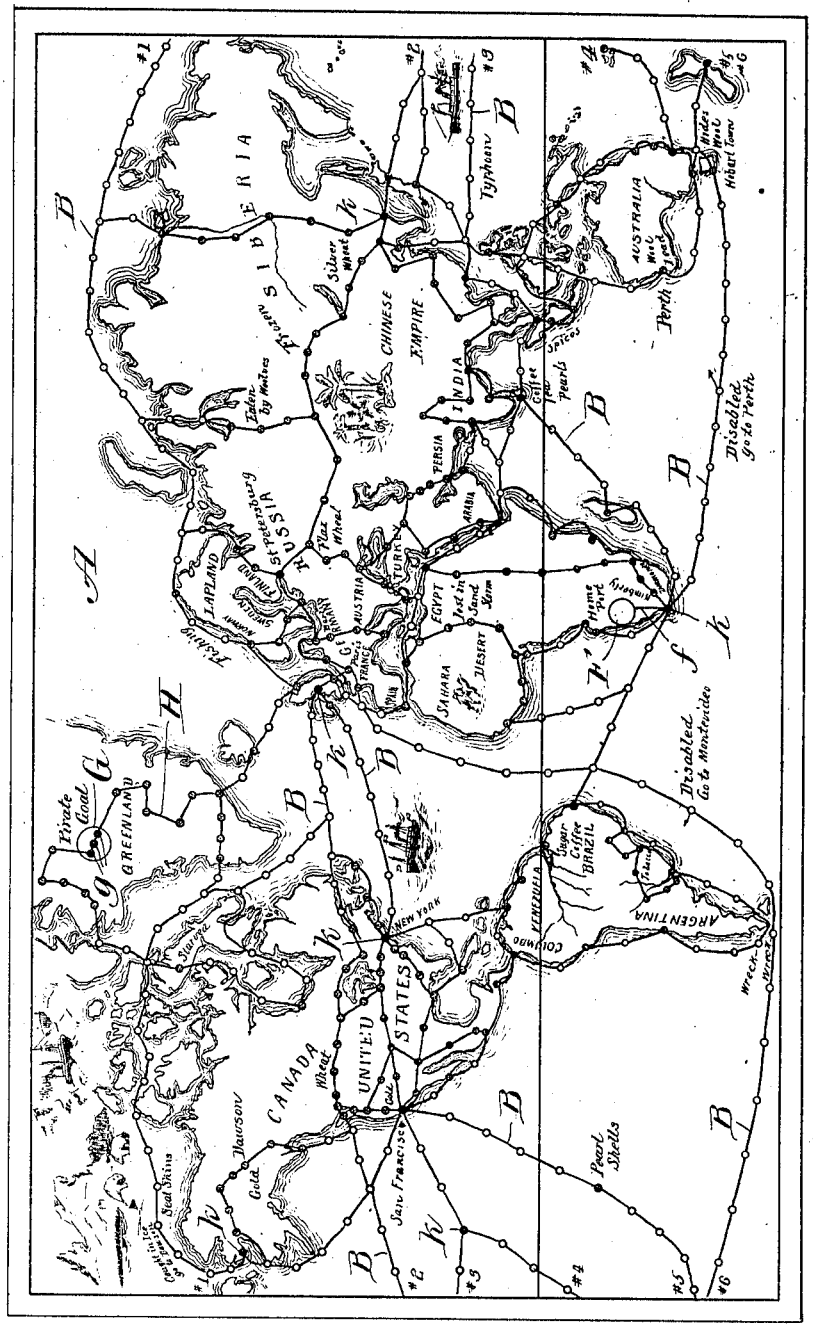

E. G. SANDERSON.
EDUCATIONAL GAME APPARATUS.
APPLICATION FILED NOV. 12, 1908.

952,997.

Patented Mar. 22, 1910.
2 SHEETS—SHEET 2.

Fig. 2.

DIAMONDS     40 points
Stop at
                    C
     KIMBERLY
     SOUTH AFRICA

Fig. 4.

HIDES & WOOL   10 points
Stop at
                    $C^2$
     HOBART TOWN
     TASMANIA ISLAND
          near Australia

Fig. 3.

GOLD    $C'$    30 points
Stop at
     SAN FRANCISCO, USA
     NORTH AMERICA

Fig. 5.

SEALSKINS     20 points
Stop at
                    $C^3$
     SEALSKIN REGION
     North of ALASKA

Fig. 6.

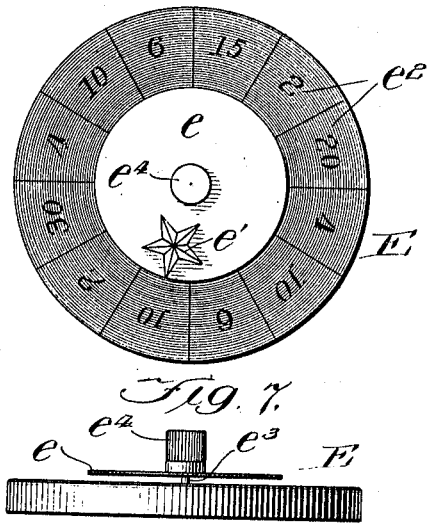

Fig. 8.

Fig. 7.

Witnesses:
Harry S. Gaither

Inventor
Elizabeth G. Sanderson
by Walter H. Chamberlin
atty

UNITED STATES PATENT OFFICE.

ELIZABETH G. SANDERSON, OF STOCKTON, CALIFORNIA, ASSIGNOR TO NEW IDEA GAME COMPANY, OF OAKLAND, CALIFORNIA, A CORPORATION OF CALIFORNIA.

EDUCATIONAL GAME APPARATUS.

952,997.  Specification of Letters Patent.  Patented Mar. 22, 1910.

Application filed November 12, 1908. Serial No. 462,210.

*To all whom it may concern:*

Be it known that I, ELIZABETH G. SANDERSON, a citizen of the United States, residing at Stockton, county of San Joaquin, State of California, have invented a certain new and useful Improvement in Educational Game Apparatus, and declare the following to be a full, clear, and exact description of the same, such as will enable others skilled in the art to which it pertains to make and use the same, reference being had to the accompanying drawings, which form a part of this specification.

My invention has for its object to produce a novel and attractive game apparatus which may be played by two or more persons and which, in addition to affording entertainment, will cause the players unconsciously to acquire accurate knowledge of geography, of commercial routes of travel, and of the products and resources of the different countries and places.

The various features of novelty whereby my invention is characterized will hereinafter be pointed out with particularity in the claims; but, for a full understanding of my invention and of its object and advantages, reference may be had to the following detailed description taken in connection with the accompanying drawings, wherein:

Figure 1 is a plan of the board or map of my improved apparatus; Figs. 2 to 5 are front views of several cards of a series forming part of the game apparatus; Figs. 6 and 7 are respectively plan and side views of a spinner; and Fig. 8 is a perspective view of one of the men or pieces.

Referring to the drawings, A represents a map, preferably though not necessarily a map of the world. The map is preferably provided with a stiff backing so as to form thereof a durable game board. On the map are marked the principal routes of commerce, both land and water, these being indicated by the reference character B. Where the map is a development in a plane surface, certain of the routes will of course terminate at one end of the map and begin again at the opposite end; and I therefore prefer to mark the routes so that when one end of the map is reached the player may readily determine which route to enter upon at the other end. This may conveniently be done by numbering each route similarly at both ends of the map.

The map will of course contain the principal cities, commercial centers, or distributing points along each route and, in addition thereto, I provide numerous intermediate stations which are arbitrarily spaced at convenient distances apart. Adjacent to each of the principal points, which may be termed destination stations, I place legends setting forth the particular commercial product or products of that region. Thus, in the vicinity of San Francisco, I place the word "Gold;" in the vicinity of Kimberly, the word "Diamonds;" in Tasmania, the words "Hides" and "Wool;" in the Arctic Ocean above Alaska, "Seal skins." I also provide a series of cards each of which bears one of the aforesaid legends together with the name of the nearest station or stopping point: thus, card C, shown in Fig. 2, has displayed prominently thereon the word "Diamonds," together with the direction "Stop at Kimberly, South Africa;" card $C^1$, shown in Fig. 3, has thereon the word "Gold" together with the direction "Stop at San Francisco, U. S. A., North America;" card $C^2$, has thereon the words "Hides" and "Wool" and also "Stop at Hobart Town, Tasmania Island, near Australia;" card $C^3$, bears the words "Seal Skins" and the direction "Stop at seal skin region North of Alaska;" and similarly as many more cards as may be desired to display the commercial products of different localities and the names of the nearest cities or stations.

The game may be played by any desired number of persons, a movable man or piece D being provided for each player. The rate of movement of the men or pieces is determined by any suitable form of chance device, as for example, by means of a revoluble disk $e$ having thereon an index device $e^1$ which is adapted to point to any one of the series of members $e^2$ carried by a supporting member E. The disk may be revolubly supported upon a stem $e^3$ projecting upwardly from the support into the handle $e^4$ through which the disk is turned.

All of the men or pieces preferably start from a common point preferably selected so as to be outside of the routes of travel in order to avoid confusion. To this end I have placed in South Africa a "Home port" F which lies outside of the regions of travel but is connected thereto by a line $f$ denoting a single step of a trip or journey. To begin the play each of the players puts his piece into the home port and then draws a card. The cards drawn determine the destinations to which the pieces are to be moved and at the same time impress upon the players the nature of the commerce of the particular region to which the trip or journey is to be made. The players move in regular rotation, each in turn operating the spinner and moving as many stations toward his destination as the spinner determines. Thus if the index points to the number 6, the player moves six stations from the home port toward the destination along any desired route, of course selecting the route which has the smallest number of stations between the home port and the destination. At various points along the routes are marked conditions which the exigencies of travel may bring about. Thus at one of the intermediate stations in the ocean route between South Africa and Tasmania is placed the legend "Disabled, go to Perth". If a piece is brought to this particular station at the end of a move, the direction must be followed and the man or piece conveyed to Perth, from which point the journey may be continued at the next move. Similarly, at the lower end of South America certain of the stations are marked with the word "Wreck", indicating that the ship has been wrecked and consequently causing the player to lose all the distance which he has gained, if his piece stops at one of these stations, and making it necessary for him to return to the home port and await his turn before moving again. In this same way there are distributed over the map legends which indicate the various dangers and vicissitudes of travel so that, not only is the interest of the players maintained, but they are instructed in the varying conditions which are met at every point on the globe.

The traveler may pick up any players in his path, and send them to home port, thus retarding their journey. When a player has reached his destination, either by exact count or by being able to pass it without using all of the steps given him by the last spin, he lays aside his card, draws another card, begins at once his new journey from the spot where he stands. The player continues to draw cards as long as he is able to complete his journeys by means of a single spin. When one of the players has completed a predetermined number of journeys, such as five or ten, such player then cries "Pirates". The drawing of cards now ceases and each of the pieces becomes a pirate and begins its journey from the point at which it stood when the cry of pirates was raised.

For carrying out the second part of the game, I provide a pirate goal, preferably at some inaccessible point. In the arrangement shown, I have selected a point G in the icy regions of Greenland and marked it "Pirate goal" and have provided an arbitrary route H which preferably joins some commercial route at a plurality of points and passes through the pirate goal. The players move as before, all, however, traveling toward the pirate goal. It is necessary for a piece to reach the pirate goal by exact count, that is, upon the last step of a number of steps which a turn of the spinner determines.

In order to make it easier to reach the pirate goal by exact count, I prefer to have a plurality of stations, such as $g$ within the pirate goal so that the end of the journey is reached whenever a piece stops at either of these stations. Whenever a man or piece reaches the pirate goal the player lays aside a predetermined number of his cards, say five cards, if the number of trips which originally must be made is ten, and thereafter these cards can no longer be taken away from the player. Whenever a pirate can advance a sufficient number of steps to overtake or overtake and pass another pirate who lies in his path, he may either capture the latter pirate and rest upon the spot or station vacated by the captured pirate, or he may simply pass the pirate in his path without paying any attention to him. If a pirate is captured he must pay as ransom one of his cards and return to the home port. If a captured pirate have no card so as to be able to pay ransom he is eliminated from the game. As soon as a pirate has landed in pirate goal he returns to the home port and makes a new start. When a pirate reaches the goal the second time all of the cards which he still has are placed to his credit with the cards originally carried into the goal and the game is at an end.

To determine the winner of the game I make use of points, each card representing a certain number of points and the sum of the points represented by all of the cards which any player carried into the pirate goal representing the score of that player. The player having the largest score wins. I prefer to make the points which each card represents a part of the educational scheme which makes the players unconsciously acquire an accurate knowledge of the commerce of different countries and localities. To this end the number of points which each card represents is made to correspond approximately to the unit value of the commercial product displayed by the card. Thus diamonds are in the mind of the ordinary person one of the most valuable articles of commerce. Consequently card C is made to represent a large number of points, in the present instance forty. Gold is less valuable than diamonds but still very valuable and therefore card C¹ will represent a high value but less than card C. Card C¹ may count thirty points. Seal skins are less valuable than gold and therefore card C³ may represent twenty points. Hides and wool are the least valuable of the products displayed on any of the cards illustrated, so that card C² may be made to represent ten points.

By bearing in mind the commercial products of different countries as well as the fact that the points represented by any kind of card are proportionate to the unit value of the product displayed by the card, each player will know whether the other players have cards which represent a high value and whether or not it is worth while capturing a pirate for ransom or disregarding him. This is particularly true after pirate has made one trip to the pirate goal, for in that case perhaps all of the best cards of the player whom the pirate represents will have been placed beyond danger of capture.

In order further to increase the interest of the game certain of the station or stopping points may be made safety stations, which will prevent a pirate or traveler from being captured or passed while standing upon one of these stations. It is unnecessary to mark these stations with legends since all the safety stations may be given some distinctive color. In the drawing I have shown a number of safety stations $k$ in solid black and, whenever a man or piece is resting upon one of these black stations, he is free from interference and furthermore, any pirate or traveler who must pass him to complete his move loses that move.

The map may of course be illuminated with sketches indicating the physical condition of various localities or other matter which will not only be interesting but which will have a distinctive educational value.

While I have described only briefly and in outline salient features of the preferred embodiment of my invention I do not desire to limit my invention further than is indicated by the terms of the definitions of my invention which constitute the appended claims.

Having now described my invention, what I claim as new and desire to secure by Letters Patent is:

1. An article of manufacture comprising a map having thereon lines indicating commercial routes of travel along which men or pieces are adapted to be moved, an arbitrary home port associated with said routes, destination stations, legends associated with said destination stations indicative of the commercial products of the vicinity, arbitrarily-spaced intermediate stations arranged between said destination stations, a pirate goal, a plurality of stations within said pirate goal and a plurality of arbitrarily-selected lines connecting said stations within the pirate goal with said routes of travel.

2. An article of manufacture comprising a map having thereon lines indicating commercial routes of travel along which men or pieces are adapted to be moved, destination stations, arbitrarily-spaced intermediate stations arranged between said destination stations, certain of said stations bearing legends indicative of dispositions to be made of men or pieces reaching such stations, a station marked "Home port," a spot marked "Pirate goal," and one or more arbitrarily-selected lines connecting the pirate goal with said routes of travel.

3. In a game apparatus: a map having thereon lines indicating commercial routes of travel over which men or pieces are adapted to be moved, legends in different localities indicative of the commercial products of said localities; arbitrarily-spaced stations along said lines; and cards for determining the direction and distance of travel of the movable men or pieces, each of said cards bearing one of the legends on the map and a number approximately proportionate to the unit value of the product indicated by that legend, and a chance device for determining the extent of movement of said men or pieces.

4. An article of manufacture comprising a map having thereon lines indicating commercial routes of travel along which men or pieces are adapted to be moved, destination stations, arbitrarily-spaced intermediate stations arranged between said destination stations, a spot marked "Home port" arbitrarily stationed outside of said lines, a spot marked "Pirate goal" arbitrarily located outside of said lines, one or more lines connecting said pirate goal with said lines indicating commercial routes of travel, and arbitrarily-spaced stations arranged along the line or lines reaching from the pirate goal.

In testimony whereof, I sign this specification in the presence of two witnesses.

ELIZABETH G. SANDERSON.

Witnesses:
S. W. NICHOLLS,
JOHN NICHOLLS.